Patented Mar. 30, 1954

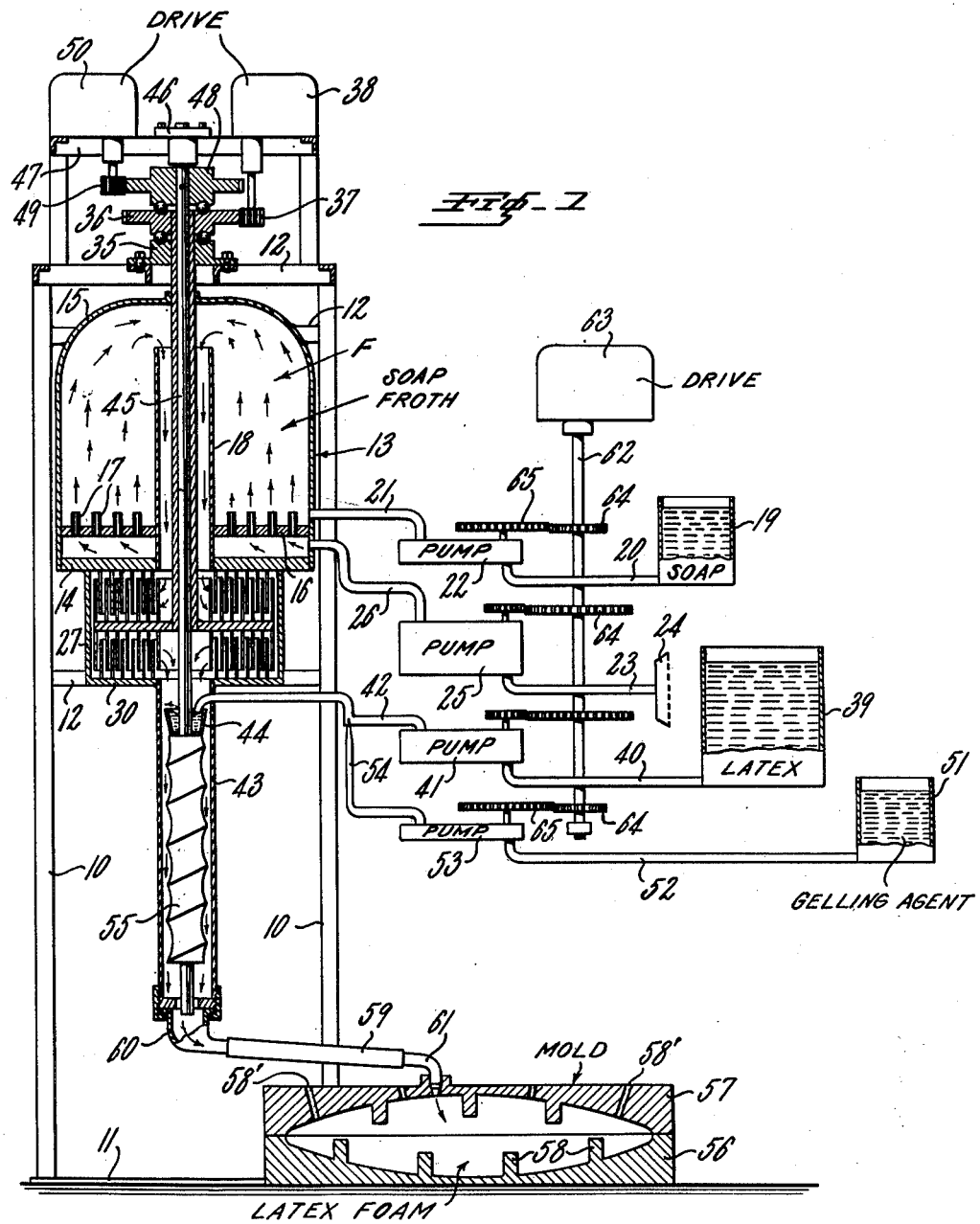

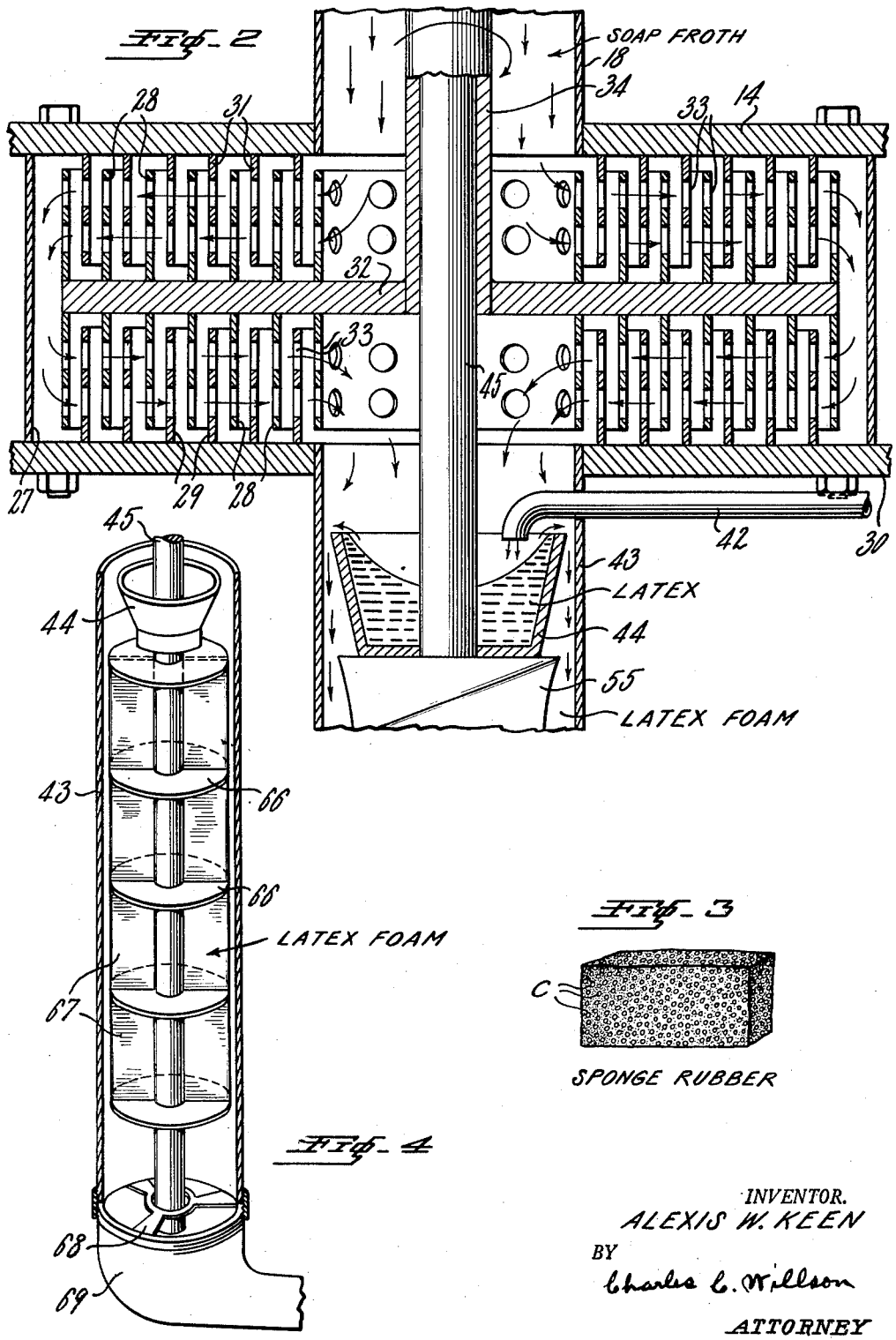

2,673,723

UNITED STATES PATENT OFFICE 2,673,723

APPARATUS FOR PRODUCING LATEX FOAM

Alexis W. Keen, Wayne Township, Passaic County, N. J., assignor to United States Rubber Company, New York, N. Y., a corporation of New Jersey Application June 8, 1950, Serial No. 166,871

9 Claims. (Cl. 261—28)

This invention relates to apparatus for making foam rubber from natural or synthetic rubber latex, so that the foam rubber or sponge rubber thus produced will be highly uniform as to bubble size and density.

It is well known that foam rubber articles may be made by compounding natural or synthetic rubber latex with certain ingredients, such as vulcanizing agents, accelerators, gelling agents and stabilizers, and then whipping the latex into a foam, depositing the foam in a mold, allowing the foam to gel by permitting it to rest at room temperature or shortening the gelling time by heat, and finally vulcanizing the foam rubber to form the molded sponge rubber article.

Foam rubber when prepared by whipping the latex into a foam has a non-uniform cellular structure, since bubbles of various sizes are produced by the air introduced into the latex during the whipping operation, and the cell structure is destroyed to some extent by the mechanical working of the latex after the gelling agent has been added. This mechanical working also produces uneven coagulation in the latex which causes the resulting sponge to have a structure composed of rubber crumbs held together by fine fibers. Such a crumb structure is weak and contains more rubber than is necessary.

These difficulties experienced heretofore in the manufacture of foam rubber from latex are avoided by the present invention, and a foam rubber is produced which is highly uniform in density and as to the size of its bubbles. This is accomplished by mixing soap froth with latex in a closed container so as to intimately commingle the soap froth with the latex. More particularly, this is accomplished by preparing a soap froth that is composed of bubbles having substantially the same size, and by admixing latex with it in such a manner that the bubbles of the soap froth are evenly coated with the latex and the even cellular structure of the soap froth is maintained.

Further, by employing the present invention a continuous streamlined flow of the foam rubber is secured, and all ingredients employed to produce the foam rubber are accurately metered and advanced in a continuous pressure stream through the closed foam producing equipment. This gives accurate control of all materials that form the foam.

In carrying out the present invention natural or synthetic rubber may be used and various frothing liquids may be used, e. g., a soap solution. The invention makes possible the accurate control of the amount of soap solution, air or other gas, latex and other materials used to produce the latex foam. In order to add to the clearness of this disclosure it is desired to point out that "froth" as herein used means soap or similar froth; "foam" means latex foam before and after it has set or gelled, and "sponge" means the vulcanized sponge rubber. Furthermore the term "measure" is to be construed broadly as covering, measuring, metering or weighing the materials that are supplied to the foam forming apparatus.

An important feature of the present invention consists of the steps of introducing a soap solution and a gas, such as air, into the closed receptacle so as to form a soap froth that fills the receptacle and is forced therefrom under pressure in a uniform stream. A measured amount of latex is then intimately commingled with this stream of soap froth in such a manner that the bubbles of the froth are evenly coated with the latex.

Another important feature of the present invention resides in shearing means which act upon the stream of soap froth to shear the same and thereby reduce the size of the soap bubbles and produce a froth of uniform cellular structure. The uniform bubble size may be as large or small as desired, depending upon the amount of shearing to which the froth is subjected.

A further feature of the present invention consists in supplying to the stream of soap froth a metered amount of latex, to which a gelling agent has been added, so as to cause the latex to come into intimate contact with the froth and form a gelable latex foam, and then delivering this foam in a few seconds to the mold where it will set quickly in the desired shape.

One important advantage secured by employing the apparatus of the present invention is that by performing the various operations in a unit that is entirely enclosed, sufficient pressure may be used to eject the latex foam from the receptacle in a continuous stream, and to deliver it into a closed vulcanizing mold. This procedure eliminates the large amount of scrap that usually accumulates as overflow while the mold is being filled from a mixing vessel. The mold also fills out better when a pressure feed is used, as the foam pushes the air out through the mold vents and prevents the formation of low spots or voids which frequently occur in the remote portions of the mold. Furthermore the latex foam produced by the present apparatus is highly uniform and therefore flows well into various portions of the mold.

The apparatus of the present invention can be commercially operated without becoming fouled by coagulation of the latex compound on the machine parts. This is due to the fact that all air jets and most moving parts are located in the soap solution and therefore are free from any accumulation of latex. Furthermore the parts over which the latex compound does pass are smooth and streamlined and designed to give the foam a velocity sufficient to cause all surfaces to be scoured continuously with fresh compound and thereby to prevent fouling.

The density and bubble size of the latex foam produced in accordance with the present invention are highly uniform, largely because all the ingredients that form the foam are metered and mixed uniformly and continuously in a closed system. No loss of gases or volatile matters can take place. The variability in cell size of foam made in an open beater, which is a common source of trouble, is thereby avoided in the present invention.

The froth structure is under control at all times. The original soap froth is controlled as to bubble size, by the size of the hollow needles used to inject air into the soap solution. Furthermore reduction of the bubbles of the soap froth to the desired fineness is controlled by the amount of shearing to which they are subjected in the shearer.

The mechanical operations employed in mixing the latex, to which a gelling agent has been added, with the soap froth are reduced to a minimum by the present procedure. This is highly desirable since excessive mechanical working of the latex after the gelling agent has been added produces a latex coagulum having a crumb structure tied together with fine fibers of low strength.

Furthermore the apparatus is so designed that the latex is rapidly intermixed with the soap froth, and remains in the apparatus only a short time. This rapid intermixing and removal of the latex is especially advantageous as it further insures against coagulation in the apparatus.

The pressure in the apparatus is preferably maintained above atmospheric, with the greatest pressure in the frothing chamber, and a gradually diminishing pressure in the successive stages of the process until, at the exit of the apparatus the pressure is equal to atmospheric.

The above atmospheric pressure is obtained in the apparatus by creating a resistance to flow in the various stages of the process while keeping the pressure at which the air enters the frothing chamber constant. For example, the pressure in the frothing chamber will be equal to the back pressure resulting from the restricted passage of the froth through the shearer. The pressure in the apparatus may of course be varied by adjusting the clearances in the froth and latex foam passage. By maintaining the pressure in the apparatus above atmospheric the froth and foam are forced therethrough in a smooth and continuous manner. Furthermore it is possible to produce very low density foam due to the expansion of the froth and foam as the pressure decreases. By forming the froth under pressure, its speed of passage out of the frother into the shearer is substantially slower. This enables the froth to drain before it leaves the frother and accordingly reduces the dilution of the latex when the froth is mixed with it. Finally by processing the soap froth and foam while their volume is smaller than it would be at atmospheric pressure, the tendency for breakdown of the cellular structure is substantially reduced.

The present invention is important in the manufacture of molded latex foam mattresses, pillows and seat cushions, because it makes possible the production of such articles with the desired cushioning action, but with less latex therein than is in the latex foam cushions made by the prior practice. The saving in latex is due to the formation of a latex sponge having a highly uniform cell structure and accordingly the absence of the latex crumb structure and fiber which is frequently present in the latex foam articles made by the prior methods. Furthermore, when molded articles are constructed of latex foam prepared in accordance with the present invention, the increased strength of the foam makes possible the removal of the hot, freshly molded articles from the mold with much less damage due to tearing than heretofore.

The present invention is also important in manufacturing latex foam flat stock or sheet material of various thicknesses, which is used to make upholstery stock pads, powder puffs and various articles used for cosmetic purposes. This is because the highly uniform cell structure of the foam gives it added strength. Furthermore when the sheet stock is split into thinner sheets, as is frequently done, uniform cell structure increases the value of the split sheets.

Today there is a large demand for highly uniform latex foam. By avoiding an uneven cellular structure and the formation of objectionable crumb or fiber in the latex, it may be readily seen that the present invention enables the preparation of this more desirable type product.

The principal apparatus used in carrying out the present invention comprises: (1) a closed frother in which jets of air are forced through a soap solution to form the soap froth, (2) a shearer in which the size of the bubbles of the soap froth is reduced by a shearing action, and (3) a mixer in which the light weight soap froth and relatively heavy latex are brought together and intimately commingled to form latex foam.

The above and other features of the present invention will be further understood from the following description when read in connection with the accompanying drawings which illustrate good practical constructions for carrying out the present invention.

In the drawings,

Fig. 1 is a vertical sectional view of apparatus constructed in accordance with the present invention;

Fig. 2 on a larger scale is a vertical sectional view through the froth shearing mechanism and latex distributing cup shown in Fig. 1;

Fig. 3 is a perspective view of a small piece of sponge rubber having the highly uniform cells secured by the present invention; and Fig. 4 is a sectional perspective view of a modified construction for thoroughly intermixing the latex and soap froth.

Referring first to Fig. 1 of the drawing in which the parts are shown more or less schematically, the principal portion of the apparatus is supported by the upright posts 10 which rest upon the floor or other supporting surface 11. These uprights are connected by the transverse braces 12. This structure serves to support a closed receptacle 13 having a cylindrical body which is closed at the lower end by a floor 14, and at the upper end by the rounded dome 15.

*Closed frother*

This receptacle 13 forms a closed frother and has provided the second floor 16, in spaced relation to the floor 14, so as to form an air chamber between these floors. The floor 16 is provided with a large number of hollow needles 17 that preferably project upwardly a short distance from the floor as shown, and are spaced about ½ inch apart. The outside diameter of these needles is important as it controls the size of the bubbles. This outside diameter may vary from about .007" to .02". The inside bore of the needles is less important and need not be more than about .008" in diameter. The action of these needles is such that when a frothing liquid, such as a soap solution, is deposited upon the floor 16 to a height above the level of the top of the needles, by means to be described, air or other gas, which is forced into the space between the floors 14 and 16, will pass upwardly through the needles 17 and through the soap solution upon the floor 16. This produces a soap froth F, that is highly uniform as to bubble size in sufficient quantity to fill the interior of the receptacle 13. This soap froth escapes from the receptacle 13, in the construction shown, through a central downwardly extending pipe or passage 18 that passes through the floors 14 and 16. The upper end of this pipe terminates a short distance below the dome 15. While the size of the bubbles formed in the receptacle 13 will depend upon the size of the needles 17, it will depend also on the pressure in this receptacle. The density of the froth should be less than .01 and preferably below .005 gram per cubic centimeter.

An important feature of the present invention, as above pointed out, resides in the closed receptacle 13 and means for supplying a metered quantity of the materials used to form the soap froth to the interior of this receptacle. In the construction shown, a soap solution contained in a tank 19 is supplied to the receptacle 13 through the pipes 20 and 21, the latter of which delivers the soap solution into the receptacle above the floor 16. In order to supply a metered or measured quantity of this soap solution to the receptacle 13, a metering pump 22 of well known construction, and preferably a gear metering pump, is employed. At the same time, air or other gas such as nitrogen in a metered stream is supplied to the chamber between the floors 14 and 16 by the pipe 23 leading from the intake head 24 to a metering pump 25 and by the pipe 26 leading from this pump to the chamber below the hollow needles 17. As a result of this construction, the air supplied by the needles 17 passes upwardly through the soap solution to form a soap froth F.

This soap froth is preferably subjected, in the receptacle 13, to a greater than atmospheric pressure, for example an added pressure of from 5 to 10 pounds. This will cause the froth F to pass downwardly within the pipe 18, in a continuous stream as indicated by arrows. As the froth rises in the receptacle 13 the excess soap solution can drain therefrom to the floor 16.

*Shearer*

The soap froth is used to impart the desired cellular formation to the latex to form latex foam, but before the latex is brought into contact with this soap froth, the froth preferably is subjected to a shearing operation to reduce the size of the soap bubbles. This shearing mechanism may be variously constructed, and as shown in Figs. 1 and 2 of the drawings is mounted in a casing 27 attached to the lower floor 14. The lower end of the pipe 18 leads to this casing. Within the casing 27 are provided a number of concentric circular bands comprising rotating bands 28, and fixed bands positioned so that the rotating bands rotate between the fixed bands. The fixed bands comprise an upper set 31 which extend downwardly from the floor 14 and a lower set 29 which extend upwardly from a floor 30 of the container 27. The rotating bands 28 are secured to a rotor or disc 32 so that some of these bands extend upwardly from the rotor and others extend downwardly from the rotor as will be apparent from Fig. 2. The clearance space between the fixed and rotating bands is preferably about ⅛". All of the bands 28, 29 and 31 are provided with the apertures 33 through which the soap froth may pass as indicated by the arrows in Fig. 2. Some of the soap froth may pass around the edges of the fixed and rotating bands, but most of the froth passes through the holes 33. The froth enters the shearer from the pipe 18 and passes outwardly around the outer edge of the rotor 32 and then inwardly below the rotor as shown.

The rotor 32 in the construction shown is rigidly secured to the lower end of a hollow shaft 34 which extends upwardly through the pipe 18 and through a bearing in the top of the dome 15 to supporting and driving mechanisms. This hollow shaft is supported by the bearing 35 and gear 36 and is driven by this gear which meshes with a pinion 37. This pinion is driven at the desired speed by the variable speed driving mechanism within the casing 38. The size of the bubbles forming the soap froth can be reduced as desired by controlling the speed of the rotor 32. If a coarse froth is desired, this rotor should be turned slowly and if a fine froth is desired, the rotor should be rotated more rapidly. For a soap froth having a density of about .005 a linear speed not in excess of 300 feet per minute may be employed without injuring the foam structure.

While a shearing mechanism such as just described is usually desirable, it is not necessary in all cases, for if a coarse cell structure is desired the shearing step may be omitted. In place of the shearing mechanism herein shown, the soap froth may be formed and sheared in the same receptacle by using a construction substantially the same as that shown in my Patent No. 2,335,339, provided the soap solution is supplied to the hollow needles or air jets, and the receptacle is closed so that an above atmospheric pressure may be built up therein.

It is essential in carrying out the present invention that the soap froth, whether coarse or fine, have intimately mixed therewith a rubber latex compound so as to form the desired latex foam. A good practical form of apparatus for intimately intermixing the liquid latex with the soap froth will now be described.

*Mixer*

The density of the soap froth will decrease as it progresses through the apparatus because the back pressure decreases and permits the soap bubbles to expand. The density of the soap froth upon reaching the mixing area may be, for example, about .005 gram per cubic inch. The density of the liquid latex as it enters the mixing area is about 1.0. This very great difference in the density of the two materials makes it difficult to mix them thoroughly without crushing the soap froth. One highly desirable construction for intimately mixing the latex compound with a flowing stream of soap froth is shown in Figs. 1 and 2 of the drawing and will now be described. A supply of natural or synthetic latex containing the usual sulphur and other compounding materials is confined within a container 39 which is connected by a pipe 40 to a metering pump 41, which pump has leading therefrom the pipe 42 adapted to supply the latex to the stream of soap froth. The casing 27 in which the shearing mechanism is housed has extending downwardly from the lower wall thereof a pipe 43, and within this pipe the latex distributing cup 44 is supported in a manner which enables it to rotate. This cup has the outwardly flaring sidewalls shown, and it is concentrically secured to a driving shaft 45 which extends upwardly through the hollow shaft 34 and is supported from the upper end portion of the machine by a bearing 46 mounted on a support 47 and a gear 48 which is driven by a pinion 49. The pinion 49 is driven at the desired speed by a variable speed mechanism mounted in the casing 50.

The latex feed pipe 42 extends inwardly through a hole in the side wall of the pipe 43 and into position to deliver its stream of latex into the cup 44 as best shown in Fig. 2. It is important to add a gelling agent to the latex at about the time it contacts the soap froth. This is done in the construction shown by providing a tank 51 containing a gelling agent. This tank is connected by a pipe 52 to a metering pump 53 which pump has leading therefrom a pipe 54 that communicates with the latex feed pipe 42 so as to inject a metered amount of the gelling agent into the latex stream with a turbulent action thereby causing the gelling agent to be mixed thoroughly with the latex before the latex enters the cup 44.

Instead of supplying the gelling agent to the latex stream in the manner just described, the pipe 54 may discharge directly into the cup 44. It is also possible to add the gelling agent to the soap solution so as to introduce it into the latex with the soap froth. The density of the latex foam is determined by the density of the soap froth and by the proportion of latex and soap froth mixed together.

The size of the cup 44 relative to the bore of the pipe 43 is important since the cup serves to reduce the size of the passage through which the soap froth is forced and wherein the soap froth is intimately commingled with the latex. During mixing, the latex is thrown outwardly, by the centrifugal force of the rotating cup, over the upper edge of the cup to contact the stream of froth moving downwardly along the inner walls of the pipe 43, as shown in Fig. 2. The size of the annular passage provided between the outer periphery of the cup 44 and inner wall of the pipe 43 may vary from about $\frac{1}{32}$ of an inch in width to $\frac{1}{4}$ of an inch, depending upon the strength and size of the bubbles forming the froth passing through this annular passage. The preferred size of this passage is between $\frac{1}{16}$ and $\frac{1}{8}$ of an inch.

The mixing cup 44 should be so designed that during operation it will always contain a fresh supply of latex and never hold a portion of latex long enough for it to coagulate therein. The continued flow of latex from the rotating cup may be best insured by using a shallow cup having tapered walls as illustrated in Figures 1 and 2. In actual practice using a cup having a 4½ inch outer diameter, it was possible to produce two cubic feet of latex foam per minute.

It is important that the latex be mixed uniformly through the soap froth stream in order that a uniform latex foam will be produced. The mixing technique just described helps to secure this uniform mixture but the cup should not be rotated at a speed that will cause the froth to break down. Usually 600 linear feet per minute is about the highest speed at which the outer edge of the cup should rotate, as at higher speeds the mixing action becomes too turbulent and causes the soap froth to break down. The mixing of the materials is further secured, in accordance with the present invention, by mounting on the lower portion of the revolving shaft 45 the feed screw 55 which extends downwardly a substantial distance within the pipe 43 as shown. This feed screw helps to mix the latex with the froth so that the latex will cover the soap bubbles and form the desired latex foam.

The feed screw serves also to help feed this foam downwardly within the pipe 43 through a restricted opening at its lower end and into a mold such as shown in Fig. 1. This mold, which consists of the lower molding section 56 and upper molding section 57, is of usual construction and may have the inwardly projecting cores 58. The latex foam is fed to this mold through a flexible pipe 59, one end of which is secured to a connector 60 attached to the lower end of the pipe 43. The other end of the pipe 59 has secured thereto a nozzle 61 adapted to be inserted in a hole in the upper mold section 57 so that the latex foam may be forced under pressure into all portions of the mold to completely fill the mold. The air vents 58' are provided in the mold sections so that the air may escape from the mold cavity while it is being filled with foam.

It is desired to point out that the construction and arrangement of receptacle 13 and pipe 43 are such that the latex is delivered into the stream of soap froth so that it will not enter the receptacle 13. Attention is called to this because if latex is permitted to enter the receptacle 13 or the shearer in the receptacle 27 it would become deposited on the apparatus therein and interfere with the proper operation of such apparatus.

When the apparatus of the present invention is employed, the gelling agent used preferably is of sufficient concentration to operate very rapidly and cause the latex foam to set or gel quickly after it enters the mold, since the quicker the foam sets the less change there will be in the latex bubbles forming the foam. By employing the construction shown in the drawing, only a few seconds need elapse from the time the gelling agent is mixed with the latex until the latex foam is formed and forced into the mold cavity.

By employing the driving means shown in the drawings, in which one shaft is provided to rotate the cup 44 and feed screw 55, and another and independent shaft 34 is employed to rotate the shearer, the speed of one may be varied without changing the speed of the other. It is usually desirable to rotate the cup and feed screw faster than the shearer.

The four metering pumps 22, 25, 41 and 53 are all shown as driven from a power shaft 62 which is rotated at the desired speed by a variable speed mechanism within the housing 63. Each pump may be driven at the desired speed by employing the proper ratio between the driving gear 64 and driven gear 65. This makes possible the supplying, as a continuous stream, of any desired metered quantity of soap solution, air, latex and gelling agent to produce a soap froth of the proper density, and a latex foam of the desired density and cell size. By mixing these materials in a closed air-tight receptacle an accurate control can be maintained of the liquids and gases that affect the final product. Furthermore, by building up a pressure within the receptacle 13 to secure a force feed, a rapid movement of the stream of soap froth out of this receptacle is secured and the latex foam is quickly formed and forced into the mold to produce the desired sponge article.

After the mold 56, 57 has been filled it may be moved into a vulcanizer to vulcanize the latex foam as heretofore, and thereby produce a finished latex sponge pillow or other article having the uniform cell structure shown in Fig. 3 where the small circles C indicate the cell structure.

The pressure maintained in the closed receptacle 13 is determined largely by the back pressure built up as the soap froth F passes through the shearer, and is then mixed with the latex and is finally discharged through the flexible pipe 59. This back pressure not only causes the froth F to flow through the apparatus in a uniform stream but serves also to influence the density of the soap froth, and accordingly the density of the final sponge product.

In some cases the revolving cup 44 alone may give sufficient mixing, but usually an additional mixing action is desired, such as produced by the feed screw 55 shown in Figs. 1 and 2, or by the different form of mixer shown in Fig. 4. In this modified construction a power shaft such as 45 has secured thereto below the cup 44 a number of spaced disks 66. There are also provided between the disks 66 the oppositely extending blades or paddles 67 that tend to scrape the latex foam from the inner walls of the tube 43. At the lower end of the shaft 45 is provided a spider 68 that is rigidly mounted in the tube 43 and loosely embraces the shaft 45. To the lower end of the tube 43 is secured the connector 69. The arrangement is such that the latex foam is repeatedly squeezed to a thin stream as it moves downwardly past one disk 66 after another. This brings the latex into intimate contact with the soap froth without crushing the froth.

The apparatus herein described may be operated at room temperature.

One suitable latex compound that may be used in carrying out the present invention is the following, the parts being by weight.

```
                                                      Dry
Natural latex (ammonia preserved, 68% solids)_____ 100
Foam stabilizer (trimene base)_____   1
Composite curative paste (60% solids)_____  10
  Sulfur _____  2.5
  Accelerator_____   2.3
  Zinc oxide_____   5.0
  Dispersing agent_____   0.2
Antioxidant (50% total solids)_____   1
  (Adjust total solids to 58%.)
```

The usual vulcanizing ingredients and antioxidants are used in the latex. The stabilizer (trimene base) is added to the latex to give better control of the setting or gelling time but is not essential.

A gelling agent is essential and any of the well known latex gelling agents may be used. Suitable gelling agents are sodium or potassium silicofluoride. These may be added to the latex through the pipe 54 of the drawing, or they may be mixed with the frothing solution and thereby mixed with the soap froth and latex.

Any of the common good frothing soaps may be used in this apparatus, such as, potassium oleate, sodium oleate, the stearates etc. A .5% to 3% concentrated aqueous solution of the soap is most satisfactory. Gases other than air may be used to form the soap froth provided they are comparatively unreactive with the latex.

It will be seen from the foregoing that the hollow needles 17 produce soap bubbles that are highly uniform as to size, and that the shearer serves to reduce the diameter of the bubbles to produce uniform bubbles of smaller size. It will also be understood that the density of the soap froth is controlled largely by the back pressure in the apparatus. This pressure will diminish gradually through the apparatus so that the bubbles will expand a substantial amount while passing through the several stages of the process. Such expansion may reduce the density of the bubbles as much as one-half. This low density froth makes possible the formation of a low density latex foam. This low density and uniform latex foam makes possible a substantial saving in the amount of latex required to produce a cushion or other latex rubber article of a desired resiliency.

Having thus described my invention, what I claim and desire to protect by Letters Patent is:

1. Apparatus for producing a latex foam in a continuous stream, comprising a receptacle, a restricted discharge passage leading from the upper portion of said receptacle, said receptacle and said discharge passage being completely closed to the atmophere except at the latex foam exit end of said discharge passage to provide a closed system in which a pressure above atmospheric can be maintained whereby froth can flow under a continuous pressure gradient through its path to the exit end of the discharge passage for the latex foam, means for introducing a soap solution into the lower portion of said receptacle, means for introducing into said soap solution air at a pressure sufficient to maintain an above atmospheric pressure in said receptacle, means for delivering a metered quantity of latex into said discharge passage at a point below the receptacle, and a mixer within said discharge passage between the point at which the latex is introduced and the exit end of said discharge passage for intermixing said latex with the soap froth passing through said discharge passage.

2. Apparatus for producing a highly uniform latex foam in a continuous stream, comprising a closed receptacle having a restricted discharge passage leading from the upper portion of said receptacle, said receptacle and said discharge passage being completely closed to the atmosphere except at the latex foam exit end of said discharge passage to provide a closed system in which a pressure above atmospheric can be maintained whereby froth can flow under a continuous pressure gradient through its entire path to the exit end of the discharge passage for the latex foam, means for supplying a frothing liquid to the lower portion of said receptacle, means for supplying jets of gas to the receptacle at a pressure sufficient to maintain an above atmospheric pressure in said receptacle and to pass through the liquid so as to form a froth that fills the receptacle and flows out uniformly under pressure through said passage, means for introducing a metered quantity of latex into the formed froth, and a rotating distributor in said discharge passage before the latex foam exit end thereof operable to distribute the latex through the froth stream after it leaves the receptacle and to bring the latex into intimate contact with the froth bubbles to form a latex foam.

3. Apparatus for producing a highly uniform latex foam in a continuous stream, comprising a receptacle, a discharge pipe leading from the upper portion of said receptacle, means for supplying soap solution to the receptacle at a regulated rate, said receptacle being completely closed to the atmosphere except through said discharge pipe, means for supplying jets of pressurized air to the receptacle at a regulated rate to maintain a pressure above atmospheric in said receptacle and to pass through the soap solution so as to form a soap froth that fills the receptacle and flows out uniformly through said pipe, means for continuously introducing latex in a metered stream into the formed froth, and a rotating distributor down stream of said receptacle and in said froth stream operable to distribute the latex through the froth stream and bring the latex into intimate contact with the froth bubbles to form a latex foam.

4. Apparatus for producing a highly uniform latex foam in a continuous stream, comprising a receptacle having a discharge passage leading from said receptacle, said receptacle and said discharge passage being completely closed to the atmosphere except at the latex foam exit end of said discharge passage to provide a closed system in which a pressure above atmospheric can be maintained whereby froth can flow under a continuous pressure gradient throughout its entire path to the exit end of the discharge passage for the latex foam, means for supplying a frothing liquid to the lower portion of said receptacle, means for supplying jets of pressurized gas to the receptacle to maintain an above atmospheric pressure therein and to pass through the frothing liquid so as to form a froth that fills the receptacle and flows out uniformly under pressure through said passage, a rotating cup supported in the froth stream in said discharge passage before the latex foam exit end thereof operable to distribute the latex through the froth stream after it leaves said receptacle, said cup having a narrow clearance with the walls of the discharge passage, means for introducing a metered quantity of latex into said cup, and means for rotating said cup so that the latex therein will be thrown outwardly by centrifugal force and flow over the edge of the cup and into the froth stream to form latex foam.

5. Apparatus for producing a highly uniform latex foam in a continuous stream, comprising a closed receptacle having a restricted discharge passage leading from the upper portion of said receptacle, said receptacle and said discharge passage being completely closed to the atmosphere except at the latex foam exit end of said discharge passage to provide a closed system in which a pressure above atmospheric can be maintained whereby froth can flow under a continuous pressure gradient through its entire path to the exit end of the discharge passage for the latex foam, means for supplying a frothing liquid to the lower portion of said receptacle, means for supplying jets of gas to the receptacle at a pressure sufficient to maintain an above atmospheric pressure in said receptacle and to pass through the liquid so as to form a froth that fills the receptacle and flows out uniformly under pressure through said passage, shearing means for the froth stream operable to reduce the size of the froth bubbles, means down stream of said shearing means for introducing a metered quantity of latex into the formed froth, and a distributor in said discharge passage before the latex foam exit end thereof operable to distribute the latex through the froth stream and bring the latex into intimate contact with the sheared froth bubbles to form a latex foam.

6. Apparatus in accordance with claim 5 in which the distributor comprises a rotating member having a narrow clearance with the walls of said discharge passage whereby the latex and froth are intermixed in a narrow zone between said distributor and the walls of said discharge passage.

7. Apparatus in accordance with claim 6 wherein the shearing means comprises a rotating member in said discharge passage, and means for independently rotating said shearing means and the distributor.

8. Apparatus in accordance with claim 5 including means for delivering a metered quantity of gelling agent into the froth stream.

9. Apparatus in accordance with claim 5 including a feed screw down stream of said distributor and before the latex foam exit end of said discharge passage operable to deliver the latex foam under pressure to the exit end.

ALEXIS W. KEEN.

References Cited in the file of this patent

UNITED STATES PATENTS

| Number | Name | Date |
|---|---|---|
| 1,582,992 | Loepsinger | May 4, 1926 |
| 1,885,785 | Thompson | Nov. 1, 1932 |
| 2,114,275 | Murphy et al. | Apr. 12, 1938 |
| 2,261,439 | Kelly | Nov. 4, 1941 |
| 2,290,729 | Blair et al. | July 21, 1942 |
| 2,290,736 | Buffington | July 21, 1942 |
| 2,295,740 | Keen | Sept. 15, 1942 |
| 2,307,082 | Te Grotenhuis | Jan. 5, 1943 |
| 2,335,339 | Keen | Nov. 30, 1943 |
| 2,381,380 | Carter | Aug. 7, 1945 |
| 2,441,235 | Blair et al. | May 11, 1948 |
| 2,572,049 | Oakes | Oct. 23, 1951 |
| 2,581,918 | Spencer | Jan. 8, 1952 |